US007810313B2

(12) United States Patent
Stewart et al.

(10) Patent No.: US 7,810,313 B2
(45) Date of Patent: Oct. 12, 2010

(54) METHOD AND SYSTEM FOR THE SIMULTANEOUS MEASUREMENT OF A PLURALITY OF PROPERTIES ASSOCIATED WITH AN EXHAUST GAS MIXTURE

(75) Inventors: Gregory Edward Stewart, North Vancouver (CA); Francis Martin Haran, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 806 days.

(21) Appl. No.: 11/725,941

(22) Filed: Mar. 19, 2007

(65) Prior Publication Data

US 2008/0229728 A1 Sep. 25, 2008

(51) Int. Cl.
*F01N 3/00* (2006.01)

(52) U.S. Cl. .............................. 60/274; 60/275; 60/276; 60/277; 60/285; 60/297; 60/301; 422/105; 422/110

(58) Field of Classification Search .................... 60/274, 60/275, 276, 277, 285, 286, 295, 297, 301, 60/303; 422/105, 108, 110, 186
See application file for complete search history.

(56) References Cited

U.S. PATENT DOCUMENTS

| 6,301,878 | B1 * | 10/2001 | Zhang et al. ................... 60/274 |
| 6,455,009 | B1 * | 9/2002 | Kato et al. .................. 422/110 |
| 6,546,720 | B2 * | 4/2003 | van Nieuwstadt et al. ...... 60/286 |
| 7,114,329 | B2 * | 10/2006 | Rosel et al. .................... 60/285 |
| 7,168,243 | B2 * | 1/2007 | Endicott et al. ............... 60/295 |
| 7,418,816 | B2 * | 9/2008 | Upadhyay et al. ............. 60/285 |

(Continued)

FOREIGN PATENT DOCUMENTS

DE    102005027784 A1    12/2006

(Continued)

OTHER PUBLICATIONS

Delphi Ammonia Sensor, Delphi Corporation MicroPatent Report, MicroPatent, LLC Smart NOx-Sensor, www.siemensvdo.com Delphi Launches World's First Ammonia Sensor, Web Wire, Feb. 22, 2007 Development of Simultaneous NOx/NH3 Sensor in Exhaust Gas, Mitsubishi Heavy Industries, Ltd, Technical Review vol. 38 No. 3 Oct. 2001, N. Kobayashi, O. Naito, A. Yamashita, T. Setoguchi, T. Murase Optical Fibre Sensors, Tenth International Conference, Glasgow, Scotland, Oct. 11-13, 1994.

(Continued)

*Primary Examiner*—Binh Q Tran
(74) *Attorney, Agent, or Firm*—Kermit D. Lopez; Luis M. Ortiz; Kevin L. Soules (57) ABSTRACT

A method for simultaneously measuring one or more properties (e.g. temperature, concentration of $NO_x$ and ammonia, etc) in an exhaust gas mixture. Signals from one or more sensors that are cross-sensitive to one or more gases can be combined. A decoupling observer algorithm can be applied, such that these cross-sensitivities are decoupled. The sensors simultaneously obtain an estimate of one or more gases in the diesel exhaust. A decoupling observer algorithm can be structured and arranged to be operable among a plurality of positions corresponding to several internal configurations.

20 Claims, 5 Drawing Sheets

U.S. PATENT DOCUMENTS

| | | | |
|---|---|---|---|
| 7,581,390 B2 * | 9/2009 | Andrews et al. | 60/301 |
| 2006/0266659 A1 | 11/2006 | Wang et al. | 205/780.5 |

FOREIGN PATENT DOCUMENTS

| | | |
|---|---|---|
| DE | 102006041135 A1 | 8/2007 |
| WO | WO 2006/087541 A1 | 8/2006 |
| WO | WO 2006/096220 A1 | 9/2006 |
| WO | WO 2006/121993 A2 | 11/2006 |
| WO | WO 2007/101597 A1 | 9/2007 |

OTHER PUBLICATIONS

PCT—Notification of Transmittal of The International Search Report and the Written Opinion of the International Searching Authority, or the Declaration, Date of Mailing Jul. 10, 2008.

* cited by examiner

METHOD AND SYSTEM FOR THE SIMULTANEOUS MEASUREMENT OF A PLURALITY OF PROPERTIES ASSOCIATED WITH AN EXHAUST GAS MIXTURE

TECHNICAL FIELD

Embodiments are generally related to sensor methods and systems. Embodiments are also related to diesel exhaust after-treatment devices. Embodiments are additionally related to techniques and devices for simultaneously measuring one or more properties associated with diesel exhaust.

BACKGROUND OF THE INVENTION

Environmental pollution, such as air pollution, is a serious problem that is particularly acute in urban areas. Much of this pollution is produced by exhaust emissions from motor vehicles. $NO_x$ gases, which are present in automotive exhaust pollution, are known to cause various environmental problems such as smog and acid rain. The term $NO_x$ actually refers to several forms of nitrogen oxides such as NO (nitric oxide) and $NO_2$ (nitrogen dioxide). Nitrogen oxide ($NO_x$) contained in exhaust gas can directly effect the human body. $NO_x$ and its emission concentrations in various exhaust gases also contribute to the formation of "acid rain" and photochemical smog. Hence, it is necessary to remove $NO_x$ from exhaust gas.

Selective Catalytic Reduction (SCR) is a technique that is used to inject urea—often a liquid-reductant agent—into an exhaust stream of a diesel engine, which is then adsorbed onto the surface of a catalytic converter. In an SCR system, urea is used as a reductant that is converted to ammonia which reacts in the presence of a catalyst to convert $NO_x$ to nitrogen and water which is then expelled through a vehicle tailpipe. Precise ammonia and NOx measurements are required to develop and characterize optimal catalyst strategies in order to prevent excess ammonia emissions or un-reacted $NO_x$ emissions. Note that the term "ammonia slip" refers to excessive ammonia emission which in practice may be caused by exhaust gas temperatures that are too cold for the SCR reaction to occur (such as during a cold start), or if the urea injection device feeds too much reductant into the exhaust gas stream for the amount of $NO_x$ produced by the engine combustion.

A technology that can immediately control the $NH_3$ feed rate according to the load change, fluctuation in $NO_x$ concentration, and so forth, is therefore needed in order to realize high-efficiency $NO_x$ removal without leaving un-reacted $NH_3$. A measuring technology with a high-speed response capable of simultaneous and continuous measurement of $NO_x$ and $NH_3$ would be indispensable. Sensors designed for $NO_x$ or $NH_3$, however, are often significantly cross-sensitive to each other. Distinguishing these components is therefore critical to successfully controlling an SCR device. It is believed that the control of SCR devices would benefit from the simultaneous measurements of $NO_x$ and $NH_3$.

One approach for the development of simultaneous $NO_x$/$NH_3$ sensor in exhaust gas involves the use of two identical sensors for measuring $NO_x$ and $NH_3$ by splitting the exhaust path in two and running each path through a different catalyst prior to entry into the respective sensor. This technique is suitable for stationary power plant application but is very expensive to implement and takes up a great deal of space and is thus not suitable for automotive applications.

In an effort to address the foregoing difficulties, it is believed that two sensors with dissimilar sensitivities and cross sensitivities to $NO_x$ and $NH_3$ can be combined and a decoupling observer algorithm applied for simultaneously measuring $NO_x$ and $NH_3$ in diesel exhaust as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensor method and system.

It is another aspect of the present invention to provide for improved diesel exhaust after treatment devices.

It is a further aspect of the present invention to provide for a method and system for simultaneously measure one or more properties (e.g., concentrations $NO_x$ and ammonia, temperature, etc) associated with an exhaust gas mixture.

The aforementioned aspects and other objectives and advantages can now be achieved as described herein. A method and system for simultaneously measuring a plurality of properties (e.g., gas, temperatures, etc.) of an exhaust gas mixture (e.g., diesel exhaust) is disclosed. Signals from a plurality of sensors that are cross-sensitive to a first property (e.g., $NO_x$) and a second property (e.g., $NH_3$) can be combined. A decoupling observer algorithm can be applied, such that these cross-sensitivities are decoupled and the sensors simultaneously obtain an estimate of one or more such properties. Such a method and system can enable the use of inexpensive sensor technologies that have been previously ruled out due to their cross-sensitivities. Possible configurations utilizing such sensors and a decoupling observer algorithm can include, for example, control module (ECM) based configurations, intelligent sensor configurations, and/or intelligent sensor configuration for on board diagnostics.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
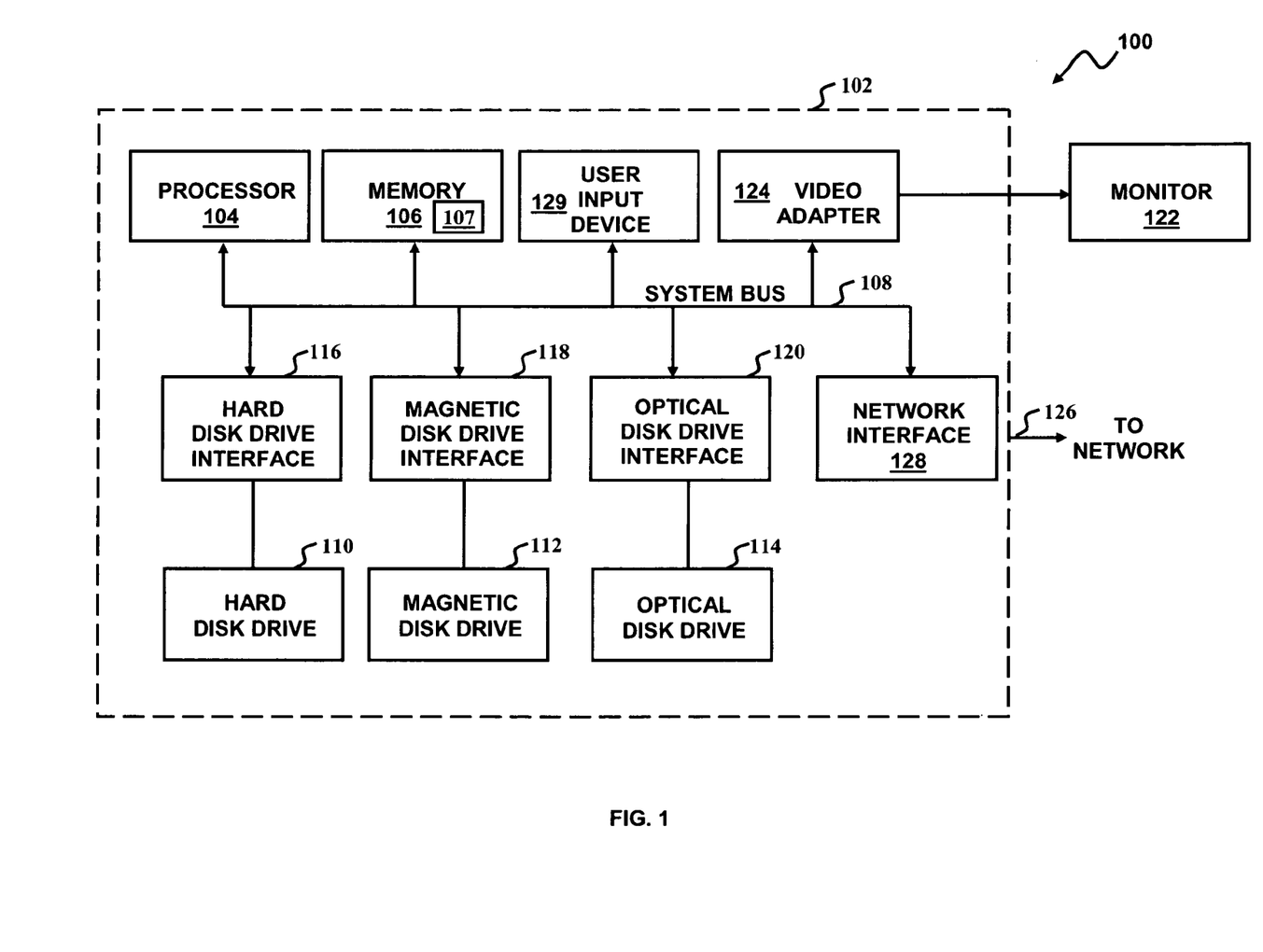
FIG. 1 illustrates a block diagram of an example data-processing apparatus, which can be adapted for use in implementing a preferred embodiment.

FIG. 1 illustrates a block diagram of a data-processing apparatus 100, which can be adapted for use in implementing a preferred embodiment. It can be appreciated that data-processing apparatus 100 represents merely one example of a device or system that can be utilized to implement the methods and systems described herein. Other types of data-processing systems can also be utilized to implement the present invention. Data-processing apparatus 100 can be configured to include a general purpose computing device 102. The computing device 102 generally includes a processing unit 104, a memory 106, and a system bus 108 that operatively couples the various system components to the processing unit 104. One or more processing units 104 operate as either a single central processing unit (CPU) or a parallel processing environment. A user input device 129 such as a mouse and/or keyboard can also be connected to system bus 108.

The data-processing apparatus 100 further includes one or more data storage devices for storing and reading program and other data. Examples of such data storage devices include a hard disk drive 110 for reading from and writing to a hard disk (not shown), a magnetic disk drive 112 for reading from or writing to a removable magnetic disk (not shown), and an optical disc drive 114 for reading from or writing to a removable optical disc (not shown), such as a CD-ROM or other optical medium. A monitor 122 is connected to the system bus 108 through an adapter 124 or other interface. Additionally, the data-processing apparatus 100 can include other peripheral output devices (not shown), such as speakers and printers.

The hard disk drive 110, magnetic disk drive 112, and optical disc drive 114 are connected to the system bus 108 by a hard disk drive interface 116, a magnetic disk drive interface 118, and an optical disc drive interface 120, respectively. These drives and their associated computer-readable media provide nonvolatile storage of computer-readable instructions, data structures, program modules, and other data for use by the data-processing apparatus 100. Note that such computer-readable instructions, data structures, program modules, and other data can be implemented as a module 107. Module 107 can be utilized to implement the methods 300, 400 and 500 depicted and described herein with respect to FIGS. 3, 4 and 5. Module 107 and data-processing apparatus 100 can therefore be utilized in combination with one another to perform a variety of instructional steps, operations and methods, such as the methods described in greater detail herein.

Note that the embodiments disclosed herein can be implemented in the context of a host operating system and one or more module(s) 107. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 100, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

A number of program modules, such as, for example, module 107, can be stored or encoded in a machine readable medium such as the hard disk drive 110, the magnetic disk drive 112, the optical disc drive 114, ROM, RAM, etc or an electrical signal such as an electronic data stream received through a communications channel. These program modules can include an operating system, one or more application programs, other program modules, and program data.

The data-processing apparatus 100 can operate in a networked environment using logical connections to one or more remote computers (not shown). These logical connections can be implemented using a communication device coupled to or integral with the data-processing apparatus 100. The data sequence to be analyzed can reside on a remote computer in the networked environment. The remote computer can be another computer, a server, a router, a network PC, a client, or a peer device or other common network node. FIG. 1 depicts the logical connection as a network connection 126 interfacing with the data-processing apparatus 100 through a network interface 128. Such networking environments are commonplace in office networks, enterprise-wide computer networks, intranets, and the Internet, which are all types of networks. It will be appreciated by those skilled in the art that the network connections shown are provided by way of example and that other means and communications devices for establishing a communications link between the computers can be used.

Figure 2:
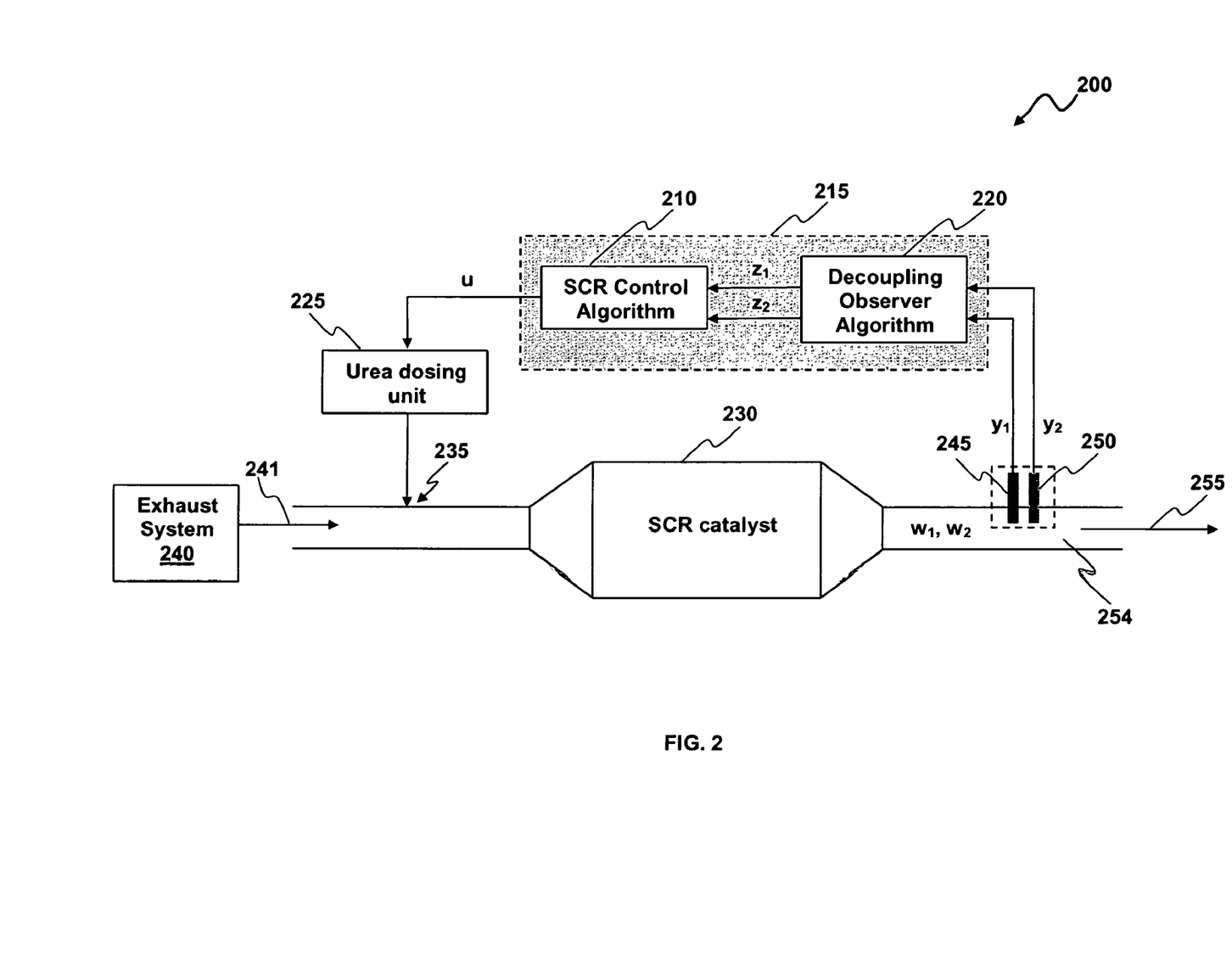
FIG. 2 illustrates a schematic diagram of a closed-loop SCR control system 200 based on ECM configuration for simultaneously measuring $NO_x$ and $NH_3$, in accordance with a preferred embodiment.

FIG. 2 illustrates a schematic diagram of a closed-loop SCR control system 200 based on ECM configuration for simultaneously measuring $NO_x$ and $NH_3$, in accordance with a preferred embodiment. An SCR control algorithm may require simultaneous estimates of both NOx and $NH_3$ emissions levels in order to determine the level of urea dosing that is appropriate for the urea dosing unit. Such an algorithm can be provided in a software module, such as, for example, module 107 depicted in FIG. 1, and processed via a processing device or microprocessor, such as the processor 104 also depicted in FIG. 1.

The SCR control algorithm 210 as shown in FIG. 2 can be configured to collect information from various sensors operating within system 100 and the host system and to provide control signals that affect the operations of system 100 and/or the host system. SCR control algorithm 210 can be a module 107 programmed or hardwired within an ECM (Electronic control module) 215 as shown in FIG. 2 in order to perform operations dedicated to certain functions. The SCR control algorithm 210 can thus be provided as software that is stored as instructions and/or data within a memory device 106 of an ECM 215 for execution by a processor 104 operating within the ECM 215. Alternatively, SCR control algorithm 210 can be a module 107 that is separate from other components of a host system.

As illustrated in FIG. 2, the system 200 can include a urea dosing unit 225, a urea injector 235, the SCR control algorithm 210, an exhaust system 240, and an SCR catalyst component 230. Arrow 241 indicates the flow of exhaust and/or other gases from the exhaust system 240 to the urea injector 235, which is connected to and forms a part of the SCR catalyst component 230. Urea injector 235 can be provided as a device that is hardware and/or software controlled and which extracts the urea solution from the urea dosing unit 225. The SCR catalyst component 230 can allow the $NO_x$ molecules within the exhaust gas engine 240 out to react with ammonia molecules to produce molecular nitrogen ($N_2$) and water ($H_2O$). Further, system 200 can include physical sensors 245 and 250 that can be configured to measure and/or analyze $NO_x$ emissions exhausted from the exhaust system 240 after the use of the SCR catalyst component 230.

The sensors 245 and 250 can also provide actual $NO_x$ emission values to SCR control algorithm 210 based on the use of decoupling observer algorithm 220 associated with system 200. Note that algorithm 220 can also be provided as a software module, such as, for example, module 107 of FIG. 1. The data-processing apparatus 100 together with the SCR control algorithm 210 can therefore be utilized to monitor and control the operations associated with SCR system 200. According to one embodiment of the present invention, SCR control algorithm 210 can be implemented as a part of an Engine Control Module (ECM) 215 that monitors and controls the operation of an engine associated with system 200.

The SCR control system 200 can inject a source of $NH_3$ usually urea 235 from a urea dosing unit 225 into the exhaust gas engine output path 240. The dosing of urea solution into the urea injector 235 can be precisely controlled by the urea dosing unit 225. The $NH_3$ is then adsorbed on to the surface of the SCR catalyst 230 and reacts with the exhaust $NO_x$ from the exhaust gas engine output path 240 to form harmless $N_2$ and $H_2O$ emissions, which pass through and out the exhaust gas tailpipe 254 as indicated by arrow 255. The true concentration of $NO_x$ and $NH_3$ from the exhaust gas is shown as $w_1$ and $w_2$ in FIG. 2. Poor $NH_3$ mixing, temperature-dependant catalyst efficiencies, catalyst aging, rapidly changing engine-out exhaust gas 240 properties and so forth are factors that can contribute to non-ideal chemical reactions and thus elevated $NO_x$ or $NH_3$ tailpipe emissions as indicated by arrow 255. It can be appreciated that although the embodiments discussed herein relate to the simultaneous measurement of $NO_x$ and $NH_3$ in diesel exhaust, the embodiments can apply to measuring other types of gases. $NO_x$ and $NH_3$ are therefore presented herein for general illustrative purposes. Other types of gases can also be measured according to the general methodology and configuration discussed herein.

In the ECM configuration of system 200, the decoupling observer algorithm 220 can be located onboard the ECM 215. The DOA 220 receives signals $y_1$ and $y_2$ as illustrated in FIG. 2 from the sensors 245 and 250 and converts such signals into estimates of $NO_x$ and $NH_3$ as respectively shown as $z_1$ and $z_2$ in FIG. 2. The SCR controller algorithm 210 then uses the estimated $NO_x$ and $NH_3$ values $z_1$ and $z_2$ to command an appropriate amount of urea u as shown through urea dosing unit 225 into urea injector 235 such that tailpipe-out emissions as indicated by arrow 255 satisfy $NO_x$ and $NH_3$ emissions targets.

The signal processing design for $NO_x$ can be represented as follows. The response of the first sensor 245 can be modeled by the dynamical relationship as indicated by equation (1) below:

$$y_1(t)=g_{11}(s)w_1(t)+g_{12}(s)w_2(t) \qquad (1)$$

where $g_{11}$ represents the response of sensor 245 to $NO_x$ and $g_{12}$ represents the response of sensor 245 to $NH_3$. Where the notation x(t) represents a signal as a function of time t. In this context, the notation g(s) refers to a transfer function defined as follows Let the signal x(t) be the input to a general linear time-invariant system, and let the signal y(t) be the output, and the Laplace transform of x(t) and y(t) be respectively $$X(s) = L\{x(t)\} := \int_{-\infty}^{\infty} x(t)e^{-st}dt$$

and $$Y(s) = L\{y(t)\} := \int_{-\infty}^{\infty} y(t)e^{-st}dt$$

Then the output "y" is related to the input signal "x" by the transfer function g(s) as $$Y(s)=g(s)X(s)$$

And the transfer function itself is therefore $$g(s) = \frac{Y(s)}{X(s)}$$

First to highlight the benefits of the inventive two-sensor and signal processing technique, we present a brief overview of the issues involved in attempting to measure NOx using only a single sensor with a typical response as shown in equation (1). Since only a single sensor is available, then we can write the signal processing logic as the scalar function as indicated by equation (2) below:

$$z_1(t)=h_{11}(s)y_1(t) \qquad (2)$$

where $h_{11}(s)$ represents a signal processing filter. Then assuming that we want to obtain an estimate of the $NO_x$ in the tailpipe, we will require that $z_1 \approx w_1$ over the frequency range of interest. Then combining the signal processing algorithm in equation (2) with the sensor response equation (1), we find that satisfying $z_1=w_1$ requires $h_{11}(j\omega)=g_{11}(j\omega)^{-1}$ and $g_{12}(j\omega)=0$. The requirement of $h_{11}(j\omega)=g_{11}(j\omega)^{-1}$ is a straightforward signal processing design requirement. But on the other hand, the requirement that $g_{12}(j\omega)=0$ means that one must impose the very demanding requirement of zero-cross-sensitivity on the sensor hardware itself. Constructing a sensor with negligible cross-sensitivities is well-known to be more challenging and expensive than permitting some cross-sensitivities.

With this in mind, now consider the inventive technique of adding a second sensor of dissimilar sensitivities to $NO_x$ and $NH_3$. Analogous to the discussion on $NO_x$ sensing, the second sensor 250 response can be provided as given by a similar linear dynamical relationship as indicated by equation (3) below:

$$y_2(t)=g_{21}(s)w_1(t)+g_{22}(s)w_2(t) \qquad (3)$$

where $g_{21}$ represents the frequency response of sensors 245 and 250 to $NO_x$ and $g_{22}$ represents the response of sensors 245 and 250 to $NH_3$.

The two sensor responses as shown in equation (1) and (3) can be combined into a single equation as follows:

$$\begin{bmatrix} y_1(t) \\ y_2(t) \end{bmatrix} = \begin{bmatrix} g_{11}(s) & g_{12}(s) \\ g_{21}(s) & g_{22}(s) \end{bmatrix} \begin{bmatrix} w_1(t) \\ w_2(t) \end{bmatrix} \quad (5)$$

Next, consider designing a multivariable signal processing algorithm from the raw sensor signals measured as shown in equation (2) and (4):

$$\begin{bmatrix} z_1(t) \\ z_2(t) \end{bmatrix} = \begin{bmatrix} h_{11}(s) & h_{12}(s) \\ h_{21}(s) & h_{22}(s) \end{bmatrix} \begin{bmatrix} y_1(t) \\ y_2(t) \end{bmatrix} \quad (6)$$

Then in order to design the 2-by-2 transfer matrix for a signal processing filter H(s) such that $z_1=w_1$ and $z_2=w_2$, the sensors 245 and 250 response G(s) to $NO_x$ and $NH_3$ need to be invertible in the frequency range of interest. (The frequency response of a stable transfer function such as (6) may be obtained by substituting $s=j\omega$ where $\omega$ represents the frequency and $j=\sqrt{-1}$.) This leads to a much milder requirement on the sensors 245 and 250 cross-sensitivities than for a single sensor. Using two sensors leads to the much easier condition can be applied as shown in equation (7) over the frequency range of interest.

$$g_{11}(s)g_{22}(s) \neq g_{21}(s)g_{12}(s) \quad (7)$$

which represents a strict mathematical condition for the invertibility of the transfer matrix in G(s) in (5). A practical extension of the condition would necessarily require that the matrix be well-conditioned in addition to invertible. In other words, that the condition number of the interaction matrix G(s) in (5) (defined as the ratio between the maximum and minimum singular values) satisfies, $$cond(G(j\omega)) \equiv \frac{\overline{\sigma}(G(j\omega))}{\underline{\sigma}(G(j\omega))} \ll \infty \quad (8)$$

for all frequencies $|\omega|<\omega_c$. Where $\omega_c$ represents the highest frequency of interest.

Which does not require zero cross-sensitivities in either of the two sensors, and can still produce estimates of both $NO_x$ and $NH_3$. Thus combining the information provided by two sensors of dissimilar sensitivities allows obtains more information than could have been obtained by separate analysis of both sensors in isolation.

From equation (7) it becomes mathematically possible to design H(s) as a decoupling observer algorithm by designing $H(j\omega) \approx G(j\omega)^{-1}$ in equation (6). For linear systems, there are many fairly standard techniques for design of decoupling observer algorithm H(s) with respect to the sensor characteristics G(s). The transfer matrix norm-based techniques for design of decoupling observer algorithm denoted by transfer matrix H(s) with respect to the sensor characteristics modeled by transfer matrix G(s) are depicted in equation (9) and (10).

$H\infty$ norm (9)
$$\min_{\text{stable } H(s)} \|I - H(s)\ G(s)\|_\infty$$

$H2$ norm (10)
$$\min_{\text{stable } H(s)} \|I - H(s)\ G(s)\|_2$$

More complex techniques also exist for nonlinear systems.

Figure 3:
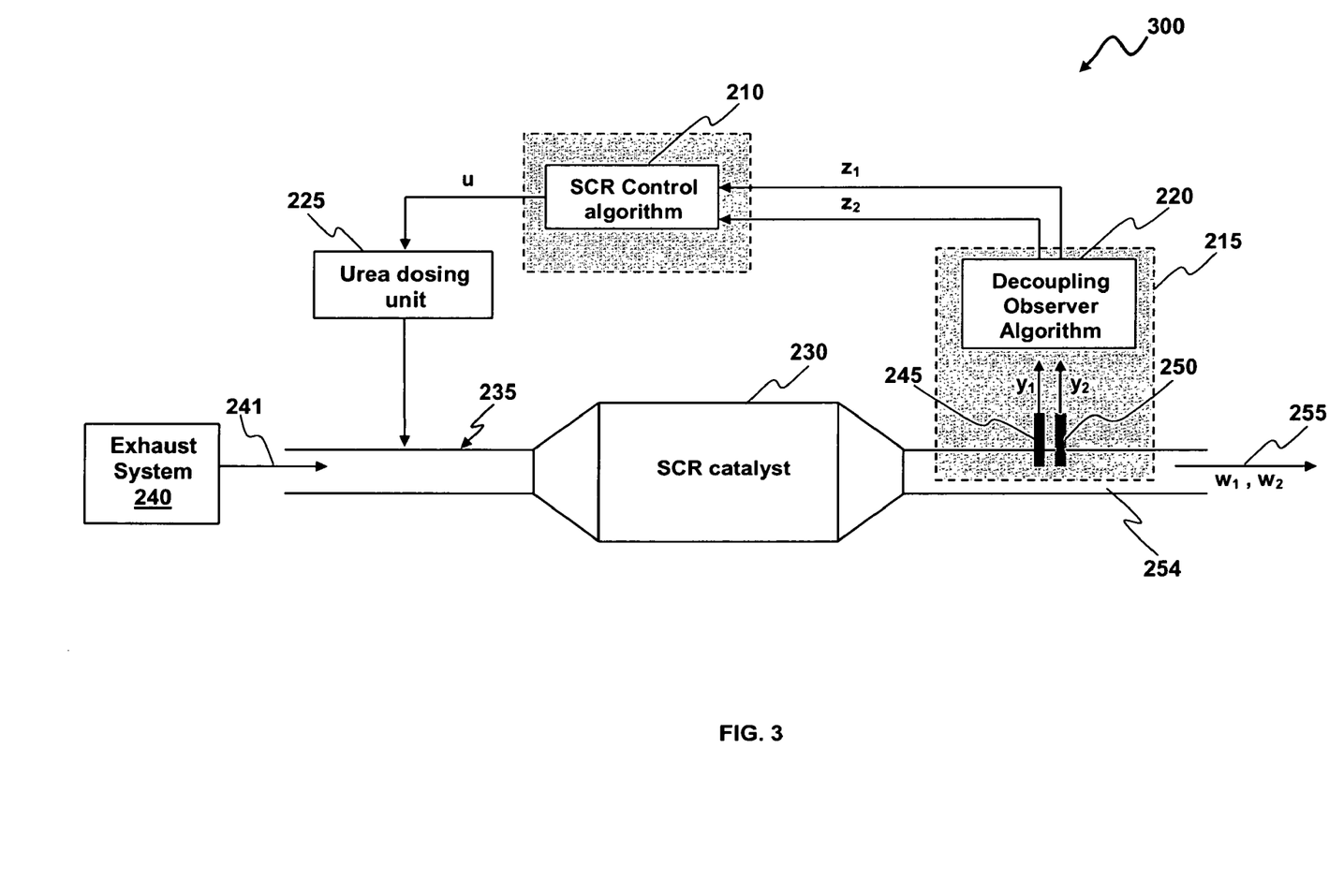
FIG. 3 illustrates a schematic diagram of a closed-loop SCR control system based on intelligent sensor configuration for simultaneously measuring $NO_x$ and $NH_3$, which can be implemented in accordance with an alternative embodiment.

FIG. 3 illustrates a schematic diagram of a closed-loop SCR control system 300 based on an intelligent sensor configuration for simultaneously measuring $NO_x$ and $NH_3$ in accordance with an alternative embodiment. Note that in FIGS. 1-4, identical or similar parts or elements are generally indicated by identical reference numerals. Additionally, it can be appreciated that although properties such as $NO_x$ and $NH_3$ can be measured according to the method and system disclosed herein, other properties such as the temperature of an exhaust gas mixture can also be measured, in addition concentrations of various gases associated with the exhaust gas mixture. The feature applies equally to all embodiments disclosed herein.

The intelligent sensor configuration of system 300 contains the same functional blocks as in the ECM configuration 200 as shown in FIG. 2. The difference between the configurations of FIGS. 2 and 3 lies in the packaging arrangement. The intelligent sensor or system 300 produces $NO_x$ and $NH_3$ estimates, which can potentially be used in the context of the third party SCR control algorithm 210 described above Referring to FIG. 4, a schematic diagram of a closed-loop SCR control system 400 based on an intelligent sensor configuration for on board diagnostics (OBD) 410 for simultaneously measuring $NO_x$ and $NH_3$, is illustrated, in accordance with an alternative embodiment. Note that in FIGS. 1-4, identical or similar parts or elements are generally indicated by identical reference numerals. Tailpipe emissions indicated by arrow 255 can be monitored by the OBD unit 410 on a continual basis. $NO_x$ level monitoring can also accomplish monitoring of the presence of urea in the system.

Figure 4:
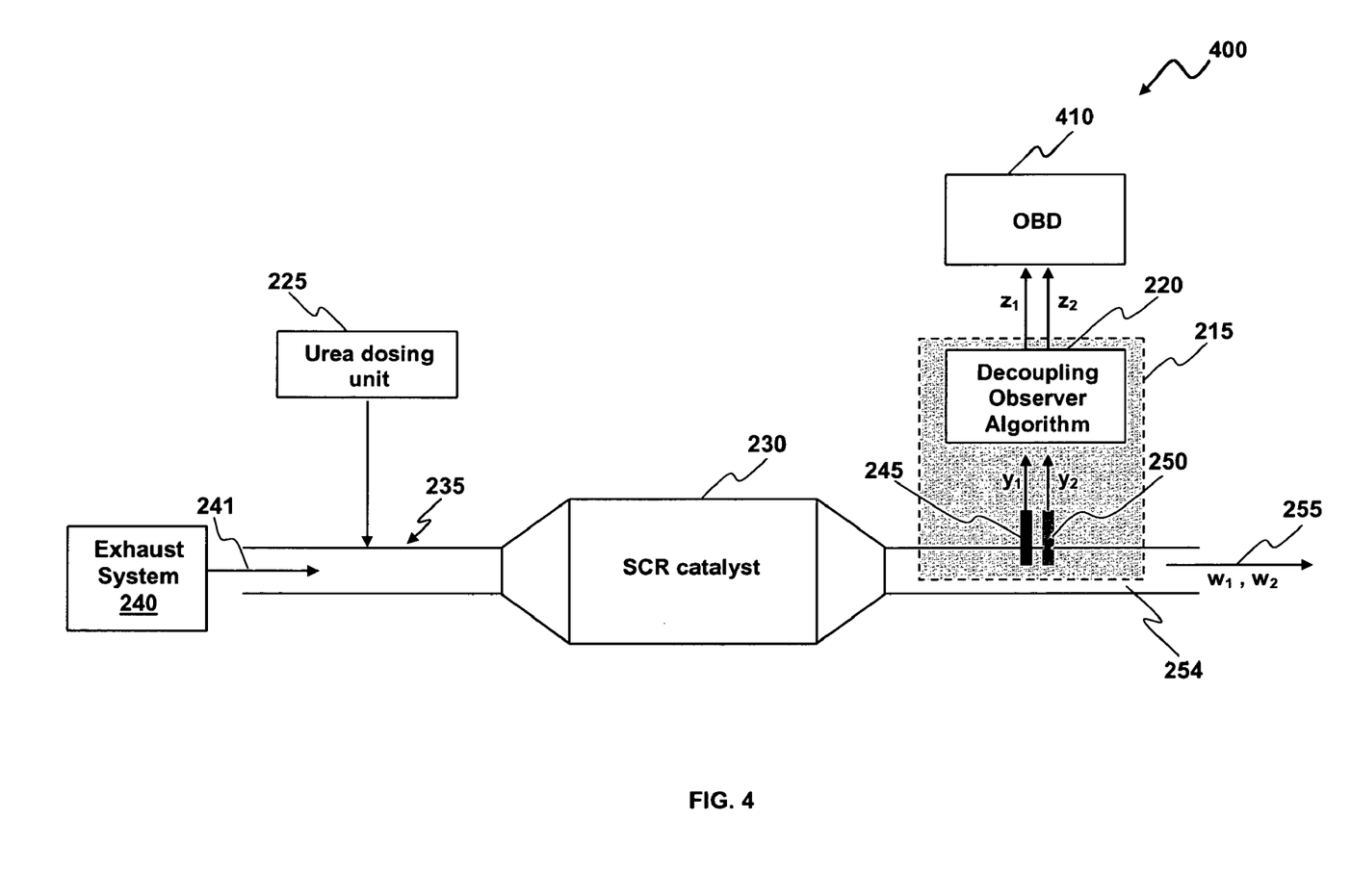
FIG. 4 illustrates a schematic diagram of a closed-loop SCR control system based on intelligent sensor configuration for on-board diagnostics (OBD) for simultaneously measuring $NO_x$ and $NH_3$, which can be implemented in accordance with an alternative embodiment.

The OBD 410 can support actions such as warning the operator when urea tank (not shown) levels are low, which will trigger an enforcement action if the urea tank is empty or near empty. Additionally, a triggering warning and enforcement action may occur if fluid other than urea is filled into the urea tank and detected by a urea concentration or ammonia sensor. In such a situation, an alert can be provided warning the operator and/or triggering enforcement action if the $NO_x$ levels exceed a particular threshold or limits. Enforcement actions of increasing severity can be triggered depending upon the duration of high $NO_x$ levels.

It will be obvious to those skilled in the art that the method disclosed herein can be extended for use by combining N sensors, each with different sensitivities, to separately estimate the levels of N different chemical species. For example, consider N=3 in diesel exhaust, wherein three sensors of dissimilar sensitivities to NO, $NO_2$ and $NH_3$ are combined. In such a case, signal processing logic could be designed by the method described above to provide estimates of the amounts NO, $NO_2$, and $NH_3$ species in the exhaust. There are many applications (including the operation of SCR aftertreatment devices) in which understanding NOx in terms of its constituent NO and $NO_2$ components would be valuable.

Figure 5:
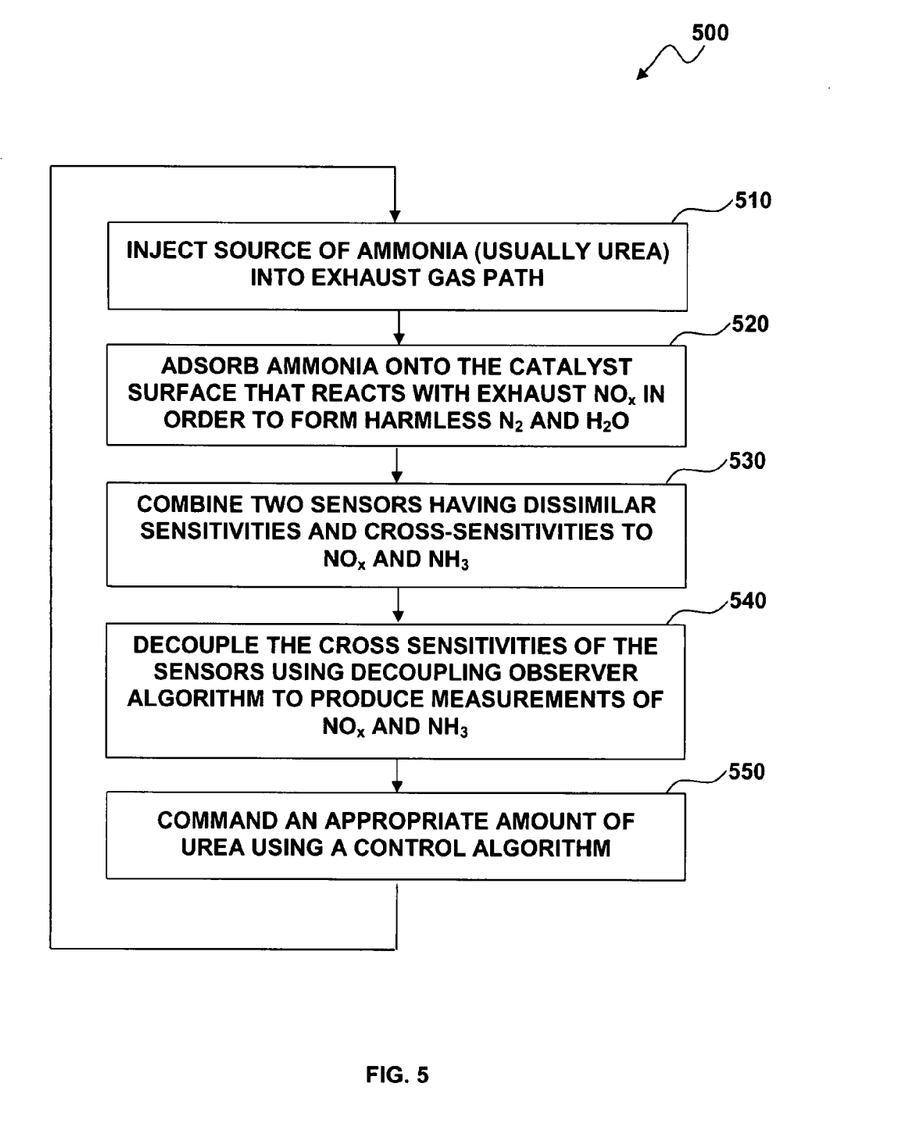
FIG. 5 illustrates a high level flow chart of operations illustrating logical operational steps of a method for simultaneous measurement of $NO_x$ and ammonia in diesel exhaust, in accordance with an alternative embodiment.

Referring to FIG. 5, a high-level flow chart of operations illustrating logical operational steps of a method 500 for the simultaneous measurement of $NO_x$ and ammonia in diesel exhaust is illustrated, in accordance with a preferred embodiment. The sources of ammonia (e.g., usually urea) can be injected into an exhaust gas path 240, as depicted at block 510. Thereafter, as indicated at block 520, ammonia can be adsorbed onto the catalytic surface 230, which reacts with $NO_x$ in order to form harmless $N_2$ and $H_2O$. Two sensors 245 and 250 having dissimilar sensitivities and cross-sensitivities to $NO_x$ and $NH_3$ can be combined, as shown at block 530. Next, as described at block 540, the cross-sensitivities of $NO_x$ and $NH_3$ can be decoupled and measured using the previously described decoupling observer algorithm 220. An appropriate amount of urea can be commanded using an SCR control algorithm 210, as depicted at block 550, which is then used to inject a source of ammonia into the exhaust gas path.

It can be appreciated that a variety of alternative embodiments can be implemented in accordance with the methods and systems described herein. For example, one alternative embodiment can utilize simultaneous $NO_x$ and $NH_3$ measurements in the feedback control of an aftertreatment device with active ammonia dosing. SCR is the most common example of such aftertreatment devices. Such configurations and related methods thereof are preferably independent of the cross-sensitivities and decoupling algorithms discussed previously. Such a situation addresses the problem where for example, an $NO_x$ sensor and an $NH_3$ sensor do not possess significant cross-sensitivities.

The overall concept disclosed herein is actually general in nature. The embodiments discussed herein have been described in the context of the two properties $NO_x$ and $NH_3$, but the disclosed invention can be extended to consider N sensors of dissimilar cross-sensitivities to N different physical properties in diesel exhaust. A few specific examples include:

With N=3 one can measure NO, $NO_2$ and $NH_3$. An aftertreatment device can benefit from additional implementations regarding the partitioning of $NO_x$ into its constituent NO and $NO_2$. For example, the response and effectiveness of an SCR aftertreatment device is strongly dependant on the ratio of NO to $NO_2$ in the exhaust $NO_x$.

With N=3 again, consider measuring $NO_x$ and $NH_3$ and decoupling cross-sensitivity to Temperature. The decoupling of temperature sensitivity is a crucial issue in practically all sensor design problems.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for simultaneously measuring a plurality of properties associated with an exhaust gas mixture, said method comprising:
   combining a plurality of sensors wherein each sensor among said plurality of sensors exhibits a cross-sensitivity to a first property and a second property in an exhaust gas mixture, wherein said plurality of sensors provide a signal indicative of an amount of said first property and said second property in said exhaust gas mixture; and
   decoupling a cross-sensitivity to said first property and said second property associated with said plurality of sensors using a decoupling observer module.

2. The method of claim 1, wherein said plurality of sensors comprises at least one NOx sensor for detecting said first property, wherein said first property comprises a concentration of NOx in said exhaust gas mixture.

3. The method of claim 1, wherein said plurality of sensors comprises at least one NH3 sensor for detecting said second property, wherein said second property comprises a concentration of ammonia in said exhaust gas mixture.

4. The method of claim 1 wherein at least one of said first or second properties comprise a temperature associated with said exhaust gas mixture.

5. The method of claim 1 wherein said plurality of sensors simultaneously obtains an estimate of a concentration of said first gas and said second gas, wherein said first gas comprises NOx and said second gas comprises ammonia.

6. The method of claim 5 further comprising processing a measurement of said concentration of said first gas and said second gas ammonia utilizing an active aftertreatment control system.

7. The method of claim 6 wherein said aftertreatment control system comprises a selective catalytic reduction control module.

8. The method of claim 6 further comprising processing a measurement of said concentration of said NOx and said ammonia utilizing a feedback control associated with an active aftertreatment control system having an active ammonia dosing capability, wherein said processing of said measurement of said concentration of said NOx and said ammonia is independent of said decoupling of said cross-sensitivity to said NOx and said ammonia.

9. The method of claim 6 further comprising:
   injecting a source of an ammonia into an exhaust gas path to create an exhaust gas mixture of said source of said ammonia and an exhaust gas;
   directly passing said exhaust gas mixture including said source of said ammonia through said selective catalytic reduction module; and
   adjusting a urea solution dosing rate with respect to said exhaust gas path based on said estimate of said concentration of said NOx and said ammonia.

10. The method of claim 1 wherein further comprising:
    configuring said decoupling observer module to be operable among a plurality of positions corresponding to a first internal configuration: and
    associating said decoupling observer module with an electronic control module.

11. The method of claim 10 further comprising:
    configuring said decoupling observer module to be operable among a plurality of positions corresponding to a second internal configuration; and
    utilizing an estimate of a concentration of said first gas and said second gas in association with a third party selective catalytic reduction control.

12. The method of claim 10 further comprising:
    configuring said decoupling observer module to be operable among a plurality of positions corresponding to a third internal configuration; and
    utilizing an estimate of a concentration of said first gas and said second gas in association with an OBD (On Board Diagnostics) unit which provides warnings and triggers enforcement actions when a level or a composition of urea is incorrect.

13. The method of claim 2 further comprising configuring said at least one NOx sensor to comprise a zirconia based multilayer sensing element.

14. The method of claim 2 wherein said at least one NH3 sensor includes a reference electrode, an ammonia selective sensing electrode and an electrolyte disposed therebetween.

15. The method of claim 1 wherein said at least one sensor among said plurality of sensors comprises an electrically-based sensor.

16. The method of claim 1 wherein at least one sensor among said plurality of sensors comprises an optically-based sensor.

17. A method for simultaneously measuring NOx and ammonia in diesel exhaust, said method comprising:
   combining a plurality of sensors, wherein each sensor among said plurality of sensors exhibits a cross-sensitivity to said NOx and said ammonia, wherein said plurality of sensors provide a signal indicative of an amount of said NOx and said ammonia in said exhaust gas mixture, wherein said plurality of sensors comprises at least one NOx sensor and at least one NH3 sensor; and
   decoupling a cross-sensitivity to said NOx and said ammonia associated with said plurality of sensors using a decoupling observer module, wherein said plurality of sensors simultaneously obtains an estimate of a concentration of said NOx and said ammonia.

18. A system for simultaneously measuring NOx and ammonia in diesel exhaust, comprising:
   a plurality of sensors, wherein sensor among said plurality of sensors exhibits a cross-sensitivity to said NOx and said ammonia, wherein said plurality of sensors provide a signal indicative of an amount of said NOx and said ammonia in said exhaust gas mixture;
   a data-processing apparatus; and
   a decoupling observer module executed by said data-processing apparatus, said module and said data-processing apparatus being operable in combination with one another to decouple a cross-sensitivity to said NOx and said ammonia associated with said plurality of sensors.

19. The system of claim 18 wherein said plurality of sensors comprises at least one NOx sensor and at least one NH3 sensor.

20. The system of claim 18 wherein said decoupling observer module is operable among a plurality of positions corresponding to a first internal configuration and is associated with an electronic control module.

* * * * *